US011803785B2

(12) United States Patent
Lehoux-Lebacque et al.

(10) Patent No.: US 11,803,785 B2
(45) Date of Patent: Oct. 31, 2023

(54) METHOD FOR COMPUTING AT LEAST ONE ITINERARY FROM A DEPARTURE LOCATION TO AN ARRIVAL LOCATION

(71) Applicant: Naver Corporation, Gyeonggi-do (KR)

(72) Inventors: Vassilissa Lehoux-Lebacque, Corenc (FR); Christelle Loiodice, La Tronche (FR)

(73) Assignee: Naver Corporation

( * ) Notice: Subject to any disclaimer, the term of this patent is extended or adjusted under 35 U.S.C. 154(b) by 281 days.

(21) Appl. No.: 16/700,096

(22) Filed: Dec. 2, 2019

(65) Prior Publication Data

US 2020/0234203 A1 Jul. 23, 2020

(30) Foreign Application Priority Data

Jan. 18, 2019 (EP) ..................................... 19305064

(51) Int. Cl.
| | |
|---|---|
| *G06Q 10/04* | (2012.01) |
| *G06Q 50/30* | (2012.01) |
| *G06Q 10/047* | (2023.01) |
| *G01C 21/34* | (2006.01) |
| *G06Q 10/0631* | (2023.01) |
| *G06Q 10/10* | (2023.01) |

(Continued)

(52) U.S. Cl.
CPC ....... *G06Q 10/047* (2013.01); *G01C 21/3423* (2013.01); *G01C 21/3453* (2013.01); *G06Q 10/06312* (2013.01); *G06Q 10/10* (2013.01); *G06Q 30/0283* (2013.01); *G06Q 50/26* (2013.01); *G06Q 50/30* (2013.01)

(58) Field of Classification Search
None
See application file for complete search history.

(56) References Cited

U.S. PATENT DOCUMENTS 5,991,688 A * 11/1999 Fukushima ............ G01C 21/34
701/410
6,779,060 B1 * 8/2004 Azvine ................... G06F 9/451
710/37

(Continued)

FOREIGN PATENT DOCUMENTS

| EP | 3339806 A1 | 6/2018 | |
| EP | 3683742 A1 * | 7/2020 | ......... G01C 21/3423 |

(Continued)

OTHER PUBLICATIONS

Graphs—Dijkstra Alghorithm, youtube webpages extract, uploaded Apr. 2, 2008Graphs—Dijkstra Alghorithm, youtube webpages extract, uploaded Apr. 2, 2008 http://www.youtube.com/watch?v=8Ls1RqHCOPw (Year: 2008).*

(Continued)

*Primary Examiner* — Octavian Rotaru

(57) ABSTRACT

A method and system generate at least one itinerary from a departure location to an arrival location, each itinerary having a beginning part from the departure location to an initial station of a multimodal transportation network of predetermined stations, a main part in the multimodal transportation network, defined as a sequence of displacements each from a station of the multimodal transportation network to another, and an end part from a final station of the multimodal transportation network to the arrival location.

10 Claims, 9 Drawing Sheets

(51) Int. Cl.
   *G06Q 30/0283* (2023.01)
   *G06Q 50/26* (2012.01)

(56) References Cited

U.S. PATENT DOCUMENTS

| | | | | |
|---|---|---|---|---|
| 6,785,608 | B1* | 8/2004 | Milici | G01C 21/3446 340/995.19 |
| 8,005,610 | B2* | 8/2011 | Bast | G01C 21/3446 701/428 |
| 8,335,643 | B2* | 12/2012 | Vandivier | G01C 21/3682 701/426 |
| 8,417,409 | B2 | 4/2013 | Bast et al. | |
| 8,494,771 | B2 | 7/2013 | Delling et al. | |
| 8,504,034 | B2* | 8/2013 | Miyake | G06Q 10/06 455/435.1 |
| 8,786,605 | B1* | 7/2014 | Curtis | G06Q 10/047 701/422 |
| 9,082,134 | B2 | 7/2015 | Gishen | |
| 10,436,597 | B1 | 10/2019 | Faaborg | |
| 2002/0059025 | A1* | 5/2002 | Kim | G01C 21/34 340/995.23 |
| 2003/0109266 | A1 | 6/2003 | Rafiah et al. | |
| 2004/0218536 | A1* | 11/2004 | Yasukawa | H04L 45/124 370/238 |
| 2005/0043884 | A1* | 2/2005 | Atarashi | G01C 21/3415 340/995.19 |
| 2007/0008949 | A1* | 1/2007 | Balandin | H04L 45/54 370/351 |
| 2008/0075007 | A1* | 3/2008 | Mehta | H04W 40/22 370/254 |
| 2010/0036606 | A1* | 2/2010 | Jones | G09B 29/106 705/400 |
| 2010/0082245 | A1* | 4/2010 | Patenaude | H04W 4/029 455/456.1 |
| 2010/0153004 | A1 | 6/2010 | Natsume | |
| 2010/0228574 | A1* | 9/2010 | Mundinger | G06Q 10/047 701/532 |
| 2010/0280748 | A1 | 11/2010 | Mundinger et al. | |
| 2010/0280853 | A1* | 11/2010 | Petralia | G06Q 10/02 705/13 |
| 2010/0305984 | A1 | 12/2010 | Ben-Yitschak et al. | |
| 2011/0112759 | A1* | 5/2011 | Bast | G01C 21/3423 701/533 |
| 2011/0125666 | A1* | 5/2011 | Laurent | G06Q 10/02 705/335 |
| 2011/0302214 | A1* | 12/2011 | Frye | G06F 16/583 707/802 |
| 2012/0008526 | A1* | 1/2012 | Borghei | H04W 4/021 370/254 |
| 2012/0253657 | A1* | 10/2012 | Francis | G06Q 10/025 701/410 |
| 2013/0245940 | A1* | 9/2013 | Shinagawa | G01C 21/3446 701/527 |
| 2013/0261967 | A1* | 10/2013 | Shinagawa | G06N 5/003 701/533 |
| 2013/0262222 | A1* | 10/2013 | Gibson | G01C 21/3423 701/538 |
| 2014/0200807 | A1* | 7/2014 | Geisberger | G08G 1/09685 701/533 |
| 2014/0257697 | A1 | 9/2014 | Gishen | |
| 2014/0278086 | A1 | 9/2014 | San Filippo et al. | |
| 2014/0343974 | A1 | 11/2014 | Graells et al. | |
| 2015/0095355 | A1* | 4/2015 | Patton | H04W 4/021 707/754 |
| 2015/0356759 | A1* | 12/2015 | Delling | G06T 11/206 345/440 |
| 2015/0371157 | A1 | 12/2015 | Jaffe | |
| 2016/0033283 | A1 | 2/2016 | Ulloa Paredes | |
| 2016/0203422 | A1 | 7/2016 | Demarchi et al. | |
| 2017/0123421 | A1 | 5/2017 | Kentley et al. | |
| 2018/0038706 | A1 | 2/2018 | Ellenby et al. | |
| 2018/0102985 | A1 | 4/2018 | Byers et al. | |
| 2019/0057340 | A1 | 2/2019 | Wang | |
| 2019/0130350 | A1 | 5/2019 | Nguyen et al. | |
| 2019/0383621 | A1 | 12/2019 | Isaacs et al. | |
| 2019/0383622 | A1 | 12/2019 | Aich et al. | |
| 2019/0383623 | A1 | 12/2019 | Aich et al. | |
| 2019/0392368 | A1 | 12/2019 | Raghunathan et al. | |
| 2020/0134747 | A1 | 4/2020 | Zhang | |
| 2020/0173808 | A1 | 6/2020 | Beaurepaire et al. | |
| 2020/0182637 | A1 | 6/2020 | Kumar et al. | |
| 2020/0272954 | A1 | 8/2020 | Serra et al. | |
| 2020/0378773 | A1 | 12/2020 | Lehoux-Lebacque et al. | |
| 2021/0182751 | A1 | 6/2021 | Pan et al. | |
| 2021/0248633 | A1 | 8/2021 | Simpson | |
| 2022/0065651 | A1 | 3/2022 | Beaurepaire et al. | |
| 2022/0095079 | A1 | 3/2022 | Volkerink et al. | |

FOREIGN PATENT DOCUMENTS

| | | |
|---|---|---|
| JP | 2007520685 | 7/2007 |
| JP | 2013511095 | 3/2013 |
| JP | 2014032139 A | 2/2014 |
| JP | 2016045020 | 4/2016 |
| JP | 2017075967 A | 4/2017 |
| JP | 2018109621 A | 7/2018 |
| WO | 2005013234 A1 | 2/2005 |
| WO | WO2008142783 A1 | 11/2008 |
| WO | WO201718583 | 11/2017 |

OTHER PUBLICATIONS

Ulloa et al, Trip planning within multimodal urban mobility, IET Intelligent Transport, 12 No. 2, pp. 87-92, Feb. 1, 2018 https://ietresearch.onlinelibrary.wiley.com/doi/full/10.1049/iet-its.2016.0265?SID=vendor%3Adatabase (Year: 2018).*

Artigues, Christian, Marie-josé Huguet, Fallou Gueye, Frédéric Schettini, and Laurent Dezou. State-Based Accelerations and Bidirectional Search for Bi-Objective Multi-Modal Shortest Paths, 2013. 2013.

Barrett, Chris, Riko Jacob, and Madhav Marathe. 'Formal-Language-Constrained Path Problems'. SIAM Journal on Computing 30 (2000): 200-0. 2000.

Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (OASIcs), pp. 123-136, Dagstuhl, 2013. 2013.

Bast, Hannah, Erik Carlsson, Arno Eigenwillig, Robert Geisberger, Chris Harrelson, Veselin Raychev, and Fabien Viger. 'Fast Routing in Very Large Public Transportation Networks Using Transfer Patterns'. In In Proceedings of the 18th Annual European Conference on Algorithms: Part I, ESA'10, 290-301. Springer-Verlag, 2010. 2010.

Bast, Hannah, Daniel Delling, Andrew V. Goldberg, Matthias Müllerhannemann, Thomas Pajor, Peter Sanders, Dorothea Wagner, and Renato F. Werneck. 'Route Planning in Transportation Networks', 2014. 2014.

Delling, Daniel, Julian Dibbelt, Thomas Pajor, Dorothea Wagner, and Renato F. Werneck. Computing Multimodal Journeys in Practice?, n.d. 2018.

Delling, Daniel, Andrew V. Goldberg, Thomas Pajor, and Renato F. Werneck. Journey planning in public transportation networks. U.S. Pat. No. 8,494,771B2, filed Sep. 7, 2011, and issued Jul. 23, 2013. https://patents.google.com/patent/US8494771/en. 2013.

Delling, Daniel, Thomas Pajor, and Renato F Werneck. 'Round-Based Public Transit Routing', n.d., 11. 2018.

Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013. 2013.

Dibbelt, Julian, Thomas Pajor, and Dorothea Wagner. User-Constrained Multi-Modal Route Planning, n.d. 2018.

Garey M. R. And D. S. Johnson. Computers and intractability: a guide to the theory of NP-completeness. Freeman, 1979. 1979.

Geisberger, Robert, Peter Sanders, Dominik Schultes, and Daniel Delling. 'Contraction Hierarchies: Faster and Simpler Hierarchical Routing in Road Networks'. In Experimental Algorithms, edited by

(56) References Cited

OTHER PUBLICATIONS

Catherine C. McGeoch, 5038:319-33. Berlin, Heidelberg: Springer Berlin Heidelberg, 2008. https://doi.org/10.1007/978-3-540-68552-4_24. 2008.

Goldberg, Andrew V., and Chris Harrelson. 'Computing the Shortest Path: a Search Meets Graph Theory'. In Proceedings of the Sixteenth Annual ACM-SIAM Symposium on Discrete Algorithms, 156-165. SODA '05. Vancouver, British Columbia: Society for Industrial and Applied Mathematics, 2005 2005.

Hansen, Pierre. 'Bicriterion Path Problems'. In Multiple Criteria Decision Making Theory and Application, edited by Gunter Fandel and Tomas Gal, 177:109-27. Berlin, Heidelberg: Springer Berlin Heidelberg, 1980. https://doi.org/10.1007/978-3-642-48782-8_9. 1980.

Idri, Abdelfattah, Mariyem Oukarfi, Azedine Boulmakoul, Karine Zeitouni, and Ali Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.

Kirchler, Dominik. 'Efficient Routing on Multi-Modal Transportation Networks'. Phdthesis, Ecole Polytechnique X, 2013. https://pastel.archives-ouvertes.fr/pastel-00877450. 2013.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44. https://doi.org/10.1127/1432-8364/2009/0031. 2009.

Liu, Xudong, Christian Fritz, and Matthew Klenk. 'On Extensibility and Personalizability of Multi-Modal Trip Planning', n.d., 7. 2018.

Ulloa Luis, Lehoux Vassilissa, Roulland Fréderic. Trip planning within a multimodal urban mobility, IET Intelligent Transport Systems, 12(2):87-92, 2018. 2018.

Witt, Sascha. 'Trip-Based Public Transit Routing'. ArXiv:1504.07149 [Cs] 9294 (2015): 1025-36. https://doi.org/10.1007/978-3-662-48350-3_85. 2015.

Witt, Sacha. Trip-based public transit routing using condensed search trees. In Marc Goerigk and Renato Werneck, editors, 16th Workshop on Algorithmic Approaches for Transporation Modelling, Optimization, and Systems (ATMOS16), No. 10, 2016. 2016.

European Search Report for EP 19305687.6 (dated Jul. 25, 2019) Jul. 25, 2019.

European Search Report for EP 19305689.2 (dated Jul. 26, 2019) Jul. 26, 2019.

U.S. Appl. No. 16/853,914, filed Apr. 21, 2020, entitled, "Method for Computing an Itinerary From a Departure Location to an Arrival Location" 2020.

Moritz Baum, Valentin Buchhold, Jonas Sauer, Dorothea Wagner, and Tobias Zündorf. Unlimited transfers for multimodal route planning: An efficient solution. In Proceedings of ESA 2019, to appear, 2019. 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019. Schloss Dagstuhl—Leibniz-Zentrum fuer Informatik. 2019.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

Ile De France Mobilités. Open data, https://www.iledefrance-mobilites.fr 2019.

Dorothea Wagner and Tobias Zundorf. Public Transit Routing with Unrestricted Walking. In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), pp. 7:1-7:14, Dagstuhl, Germany, 2017. Schloss Dagstuhl—Leibniz-Zentrum fuer Informatik. 2017.

U.S. Appl. No. 16/995,969, filed Aug. 18, 2020, entitled, "Method for Computing an Itinerary From a Departure Location to an Arrival Location" 2020.

Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportation Networks'. ArXiv: 1504.05140 [Cs], Apr. 20, 2015. http://arxiv.org/abs/1504.05140. 2015.

Web page: https://data.grandlyon.com/ Home • Métropolitan Data of the Grand Lyon.Pdf, n.d. 2018.

Web page : https://opendata.stif.info. 'Home page—Portail Open Data Île-de-France Mobilités—Open Data Île-de-France Mobilités.Pdf', n.d. 2018.

Office Action from Japanese Patent Office for Japanese Patent Application No. 2020-093731 (Japanese copunter part to U.S. Appl. No. 16/830,621) dated Mar. 23, 2021 2021.

English Translation of Abstract of Published Japanese Patent Application No. JP 2014-032139 (A) 2014.

English Translation of Abstract of Published Japanese Patent Application No. JP 2017-075967 (A) 2017.

English Translation of Abstract of Published Japanese Patent Application No. JP 2018-109621 (A) 2018.

English Translation of Abstract of Published Japanese Patent Application No. JP 2007-520685 (A) Jul. 26, 2007 2007.

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

U.S. Appl. No. 17/335,402, filed Jun. 1, 2021, entitled, "Method for Computing a Personalized Itinerary From a Departure Location To an Arrival Location" 2021.

"General transit feed standard format reference documentation," https://developers.google.com/transit/gtfs/reference/2018.

E. Cohen, E. Halperin, H. Kaplan, and U. Zwick. Reachability and distance queries via 2-hop labels. SIAM Journal on Computing, 32(5):13381355, 2003 2003.

Daniel Delling, Thomas Pajor, and Renato F. Werneck. Round-based public transit routing. In Proceedings of the Fourteenth Workshop on Algorithm Engineering and Experiments (ALENEX), 2013. 2013.

Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.

Matthias Hertel Hannah Bast and Sabine Storandt. Scalable transfer patterns. In Proceedings of the Eighteenth Workshop on Algorithm Engineering and Experiments (ALENEX), 2016 2016.

Hannah Bast, Mirko Brodesser, and Sabine Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of OpenAccess Series in Infor¬matics (OASIcs), pp. 123-136, Dagstuhl, Germany, 2013. Schloss Dagstuhl—Leibniz-Zentrum fuer Informatik 2013.

Ile De France Mobilités. Open data, https://www.iledefrance-mobilites.fr 2018.

U.S. Appl. No. 16/830,609, filed Mar. 26, 2020, entitled, "Methods for Preprocessing a Set of Feasible Transfers for Computing Itineraries in a Multimodal Transportation Network" 2020.

U.S. Appl. No. 16/830,621, filed Mar. 26, 2020, entitled, "Method for Preprocessing a Set of Non-Scheduled Lines Within a Multimodal Transportation Network of Predetermined Stations and for Computing at Least one Itinerary From a Departure Location To an Arrival Location" 2020.

Wagner, Dorothea et al. "Geometric containers for efficient shortest-path computation," ACM Journal of Experimental Algorithmics, Association of Computing Machinery, New York, NY, US, vol. 10, Dec. 31, 2005 2005.

Delling, Daniel et al. "Computing Multimodal Journeys in Practice," Jun. 5, 2013, Experimental Algorithms, Springer Berlin Heidelberg, Berlin, Heidelberg, pp. 260-271, XP047028461 2013.

Sascha Witt, "Trip-Based Public Transportation Routing," Nov. 12, 2015 (Nov. 12, 2015), Proc. Int.Conf. Adv. Biometrics (ICB);

(56) References Cited

OTHER PUBLICATIONS

[Lecture Notes in Computer Science; Lect.Notes Computer], Springer, Berlin, Heidelberg, pp. 1025-1036, XP047414792 2015.
European Search Report for EP 19305064.8 (dated Apr. 18, 2019).

* cited by examiner

METHOD FOR COMPUTING AT LEAST ONE ITINERARY FROM A DEPARTURE LOCATION TO AN ARRIVAL LOCATION

PRIORITY INFORMATION

Pursuant to 35 U.S.C. § 119 (a), this application claims the benefit of earlier filing date and right of priority to European Patent Application Number EP 19305064.8, filed on Jan. 18, 2019, the contents of which are hereby incorporated by reference in their entirety.

BACKGROUND

A journey planner (also called trip planner) is a solver used to determine an optimal itinerary from a departure location (the origin) to an arrival location (the destination), using one or more transport mode, in particular public transportation modes (subway, tram, bus, etc.—the planner is said to be "multimodal" when covering several transportation modes and allowing intermodal connections, i.e. transfers from one mode to another). Searches may be optimized on different criteria, for example fastest, shortest, least changes, cheapest. Searches may be constrained for example to leave or arrive at a certain time, to avoid certain waypoints, etc.

Public transport modes generally operate according to published schedules; given that public transport services only depart at specific times (unlike private modes of transportation such as driving, walking, or cycling, which may leave at any time), an algorithm must therefore not only find a path to a destination, but seek to optimize it so as to minimize the arrival time in this time-dependent setting.

One algorithm used to this end is the "Trip-Based Public Transit Routing" algorithm, which is a method based on iterations, similar to breadth-first search in a graph, where one iteration corresponds to taking a trip. It is disclosed in the document Sacha Witt. "Trip-based public transit routing." In N. Bansal and I. Finocchi, editors, ESA 2015, volume 9294 of Lecture Notes in Computer Science, Berlin, Heidelberg, 2015. Springer.

The Trip-Based Public Transit Routing algorithm is an algorithm for computing a Pareto front and a Pareto path per value in the Pareto front for two criteria in multimodal networks restricted to transit and walking between stations, considering an origin, a destination, and a start time. The two criteria considered are: (1) Min arrival time (i.e., the earliest arrival time considering the start time); and (2) Min number of transfers (i.e., the minimum number of connections, in other words the changes of transport mode, either within the same network—for instance from a subway line to another—or intermodally).

The Trip-Based Public Transit Routing algorithm is based on the preprocessing and pruning of the possible transfers between trips. The aim is to build for each trip a neighborhood of reachable trips that will be as small as possible. For the algorithm to be correct, all the transitions between trips that belong to at least one optimal path per value in the Pareto front of any query must be present in the computed neighborhoods. The pruning of all the possible transfer trips proposed in the article ensures the correction but does not compute the minimal neighborhood.

An earliest arrival time query will then consist in a simple breadth-first search like exploration in a time-independent network where the trips are vertices and the possible transfers the arcs (i.e., which explores all of the neighbor trips on the graph at the present depth prior to moving on to the trips at the next depth level).

So, in each iteration, one additional trip is taken in each solution to try and get to destination.

As explained, the current Trip-Based Public Transit Routing algorithm is restricted to transit and walking between stations, and does not allow combination with further private transportation modes such as taxi. In the known planners, the only taxi rides that could be proposed are the door-to-door ones, using taxi alone.

Nonetheless, while using taxi is both inconvenient and costly in most cities, in some circumstances, users may be willing to use it. For example, if they are far away from public transportation or if time constraints are strong and public transportation is not fast enough.

Mixed itineraries, using taxi and other modes of transportation, can prove very efficient in a suburban context. For instance, an itinerary using taxi at the beginning of the path to reach public transportation and then taking a subway to destination, hence avoiding congestion in the city, can be both faster and cheaper to the user than a door-to-door taxi path.

However, building good itineraries combining taxi and public transportation is expensive computationally. Depending on the settings, the taxi can pick you up anywhere or at given taxi stations and can then deposit you at some point in the network or at your destination. It increases greatly the complexity compared to other modes that can be used to reach or leave the public transportation network, as the maximum traveling distance would be far less while walking or riding a bicycle.

A simple solution for integrating taxi at the beginning or at the end of the path would be to consider the taxi ride like walking.

Indeed, the Trip-Based Public Transit Routing algorithm (and others algorithms like RAPTOR, see the document Daniel Delling, Julian Dibbelt, Thomas Pajor, Dorothea Wagner, and Renato F. Werneck. Computing multimodal journeys in practice. In Experimental Algorithms—Proceedings of the 12th International Symposium, SEA 2013, volume 7933 of Lecture Notes in Computer Science, pages 260-271, Springer Berlin Heidelberg, 2013—with respect to Trip-Based Public Transit Routing, in RAPTOR the breadth-first search labels the reached stations and not the trips, taking one line at each round), starts with an initialization phase, wherein the stations (i.e., the stops) from which destination can be reached, and the station that can be reached walking from the origin, are determined.

In the settings of the Trip-Based Public Transit Routing algorithm, the "origin/target" trips are trips from/to stations for which there exists a walking path of duration or distance lower than a maximum bound, for instance 10 to 20 minutes.

In practice, this bound cannot allow for a large number of origin/target stations. When taxi is considered instead of walking at the beginning or at the end of a path, the number of stations that can be reached within even 10 minutes can be very large.

In the example of FIG. 2, all the stations of the Lyon metropolis are represented: there are more than six thousands stations. It would lead to very large Pareto sets and query times if taxi duration is considered as a third criterion.

Therefore, it is desirable for a method to compute relevant and diverse itineraries using taxis at the beginning or at the end of the path.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
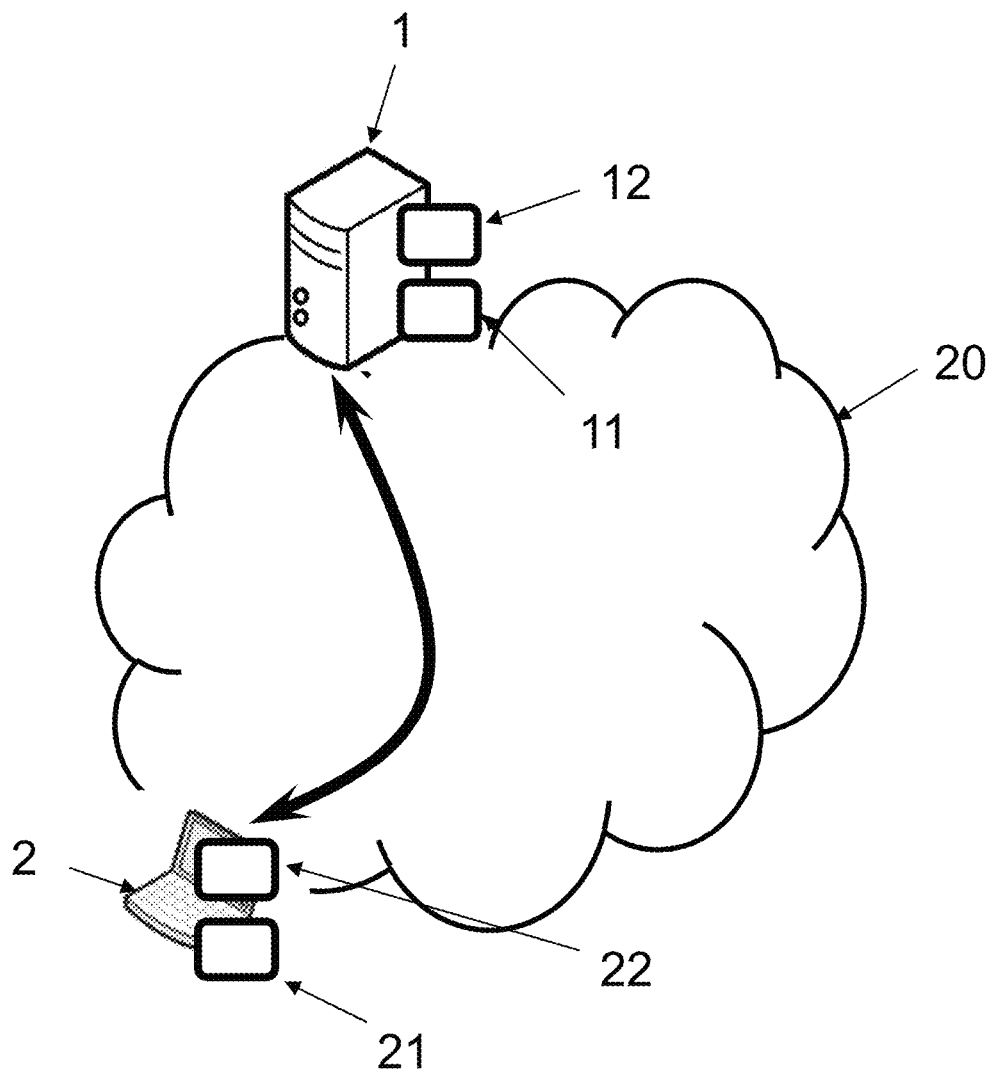
FIG. 1 illustrates an example of architecture of a system for computing an itinerary from a departure location to an arrival location.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

A method for computing at least one itinerary from a departure location to an arrival location will be described below.

In the description below, the departure and arrival locations are geographical locations, typically locations on a map as defined by an address, a point of interest, coordinates, etc.

In the description below, the determined itineraries are preferably the optimal ones (or at least close to the optimal ones; i.e., approximations of the optimal ones) according to at least one criterion such as the arrival time (which should be the earlier), the duration of the itinerary (which should be the lowest), the departure time (which should be the latest), the length of the itinerary (which should be the shortest), the number of transfers (which should be the lowest), the price (which should be the lowest), etc.

Generally speaking, a "cost" of the itinerary can be computed according to a given cost function, the cost being minimized.

In a preferred example of a Trip-Based Public Transit Routing algorithm that will be detailed in the following description, two criteria are co-considered: (1) arrival time and (2) the number of transfers.

Furthermore, each itinerary comprises: (1) a beginning part from the departure location to an initial station of a multimodal transportation network of predetermined stations; (2) a main part in the multimodal transportation network, defined as a sequence of displacements each from a station of the multimodal transportation network to another; and (3) an end part from a final station of the multimodal transportation network to the arrival location.

The multimodal transportation network is preferably a network of public transportation modes, in particular "scheduled" transportation modes; i.e., following a line (a predetermined sequence of stations) and of which timetables are known.

Examples of scheduled public transportation modes include bus, metro, tramway, train, water shuttle, carpooling, etc. It is to be noted that the multimodal transportation network might further comprise non-scheduled transportation modes such as on-demand bus, ride-hailing, or even bike sharing (wherein the users can simply take a bike for going from a station to another without any restriction), but advantageously only scheduled public transportation modes are hereby involved in the multimodal transportation network.

By station, or "stop," it is meant a facility at a given location wherein at least one of the transportation modes of the multimodal transportation network regularly stops to load or unload passengers, for example a bus station, a metro station, a train station, etc.

As explained, the main part of the itinerary; i.e., the part within the multimodal transport network; is defined as a sequence of trips each from a station of the multimodal transportation network to another. The main part is from an initial station which is the entry point of the multimodal transportation network for the present itinerary (the wording "source stop" can be found), to a final station which is the exit point of the multimodal transportation network (the wording "target stop" can be found).

By "trip," it is meant a displacement using a single one of the transportation modes, such as a bus trip; i.e., a displacement following a line. Generally, the main part comprises between two successive trips a transfer (i.e., the main part can be seen as an alternative of trips and transfers).

By "transfer," it is meant a connection from a transportation mode to another, in particular a displacement between the station at which a trip has been finished and the station at which the new trip is started. Such a transfer is performed, according to a "first transportation mode," which is none of the public transportation modes of the network, generally walking, but also possibly kick scooter or skate. The first transportation mode is a non-scheduled and station-free mode, which is freely usable by the user without any limitation.

In the following description, the preferred embodiment will be considered wherein the first transportation mode is walking; i.e., the main part of the itinerary is restricted to transit and walking between stations.

The beginning part and end part of the itinerary allow to "connect" the user to stations of the network. The beginning part and end part of the itinerary could be "null" in particular if the departure/arrival location is an isolated station: then this station could be used as the initial/final station. Nevertheless, even in such case the user has the possibility to walk to another station.

The beginning part and end part are performed according to the first transportation mode (i.e., walking) or according to a second transportation mode, which is still not one of the modes of the multimodal transportation network.

The second transportation mode is any non-scheduled and station-free mode with a longer range than the first transportation mode. It is typically taxi, but could be any equivalent transportation mode, in particular any private vehicle ride, such as a car ride (typically lift by a friend, park-and-ride, ride-hailing, etc.), a motorcycle ride, or even a helicopter ride. In the following description, the preferred example of taxi will be used, but the described methodology is not limited to this example.

Typically, the first transportation mode is universal and does not require any vehicle (or at worst a "light" and transportable one such as a skate) while the second transportation mode allows farther and faster rides but requires a heavier vehicle.

It is to be understood that both the first and second transportation modes are only restricted by the cartography; i.e., the existence of ways (in particular roads), accesses, etc. and are considered to be able to reach any location, by contrast with the modes of the multimodal transportation network which rely on a predetermined list of stations.

To sum up, any considered itinerary starts with a beginning part bringing the user from the departure location to an initial station, possibly using taxi (the second transportation mode), then the user travels in a main part into the network using various public transportation modes (the multimodal transportation network) and walking (the first transportation mode) for transfers, up to a final station, for finishing the itinerary with the end part bringing the user from the final station to the arrival location, possibly using again taxi (the second transportation mode).

The above-mentioned method is implemented within an architecture such as illustrated in FIG. 1, by means of a server 1 and/or a client 2.

Each of these devices 1, 2 are typically connected thanks to an extended network 20 such as the Internet for data exchange. Each one comprises data processors 11, 21, and optionally memory 12, 22 such as a hard disk.

More precisely, the user generally owns a client device 2 of the smartphone type, for inputting a request for itineraries (are inputted the departure location, the arrival location, and a departure time). The request may be either directly processed by the client 2, or transmitted to the server 1 for being processed there. The described methodology is not limited to any specific implementation.

It is to be noted that even if the method is performed by the client device 2, the server 1 can still be called for example for determining the taxi path in the beginning and end parts of the itinerary, and the duration of the path, based on road data.

As already explained, the Trip-Based Public Transit Routing algorithm (or any other suitable routing algorithm such as RAPTOR) starts with an initialization phase where the set of lines L from which the destination can be reached and the set of the earliest trips that can be reached from the origin are computed (in RAPTOR these are directly the stations). So, the method starts with an "initial/final stations selection" step.

When taxi is considered instead of walking for first or last miles, the number of stations that can be reached within 20 minutes can be very large.

An observation is that not all paths seem logical to users. This observation is based on the fact that some itineraries have a low probability of being chosen by a user if other solutions exist.

For instance, an itinerary where a taxi brings the person almost to destination and then lets the person finish the path by walking for 10 minutes may not seem logical: the user would prefer to be left directly at destination, unless the taxi is not allowed close to the destination (for example in a pedestrian area).

Here are some examples of cases where it might be interesting to generate those solutions from a user point of view: (1) no solution was found with other modes at the beginning and/or the end of the itinerary; (2) all the alternatives generated without taxi have either very long waiting times or very long transfer times; (3) the minimum number of transfers is very high; (4) the duration of the shortest itinerary not using taxi is very high; and/or (5) person with reduced mobility that cannot manage some of the transfers in solutions without taxi.

Although taking a taxi might be interesting depending on the circumstances, it is inconvenient in the general case for several reasons. First a user may need to book it and possibly wait for its arrival. Second, it can be quite expensive and there can be constraints on the payment mode. Third, it is not always fast, for example, in case of congestion, it can be a lot slower than public transportation.

The present method suggests only a few additional solutions with taxi, but that can seem acceptable to the user.

In order to reach this goal, some rules are set on the construction of the itineraries to generate solutions that avoid some paths unlikely to be accepted by the user. Note that it can also remove some optimal solutions according to some of the criteria, but it can be assumed that the probability is low (in particular when the criterion is earliest arrival time), so that the risk could be taken.

The idea is a "pruning" of the possible initial and final stations of the taxi itineraries.

Examples of the pruning rules are: (R1) a taxi is not taken at the beginning (or the end) of the itinerary to reach stations that are close when walking; (R2) a taxi is not taken at the beginning of the itinerary to reach a station that is close to destination by walking or a taxi is not taken from a station that is close by walking from origin to reach destination; and/or (R3) in order for the taxi part of the itinerary to be goal directed, only stations are considered that comply with a set of constraints. In the following description, the set of constraints is generically defined as a geometric constraint (such as being contained within a geometric shape, for instance an ellipse). An example of a specific geometric constraint is a boundary mapping of the constraints with respect to the departure location and the arrival location.

The idea behind the first two rules is to use a user defined boundary that will represent the maximum duration the user is willing to walk in order to reach the network from origin or the destination from the network. If the user thinks that it is acceptable to walk for 10 min or 1 km, a solution using taxi for that part of the itinerary is probably inappropriate for the user.

Figure 4:
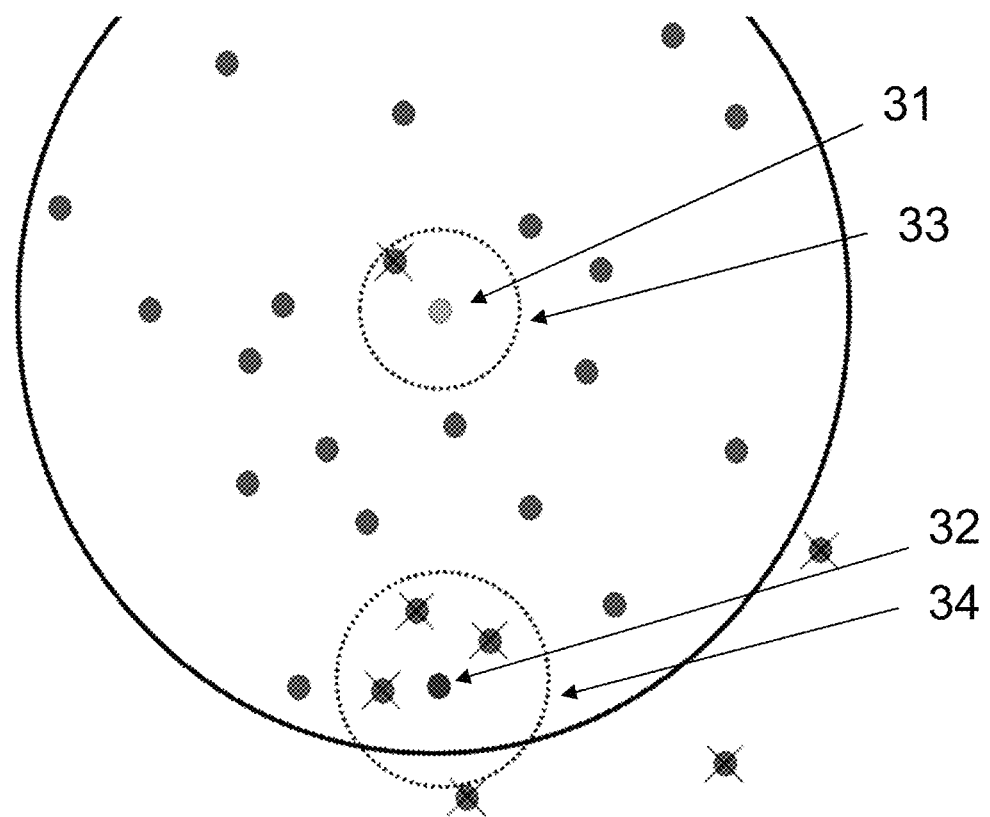
FIGS. 4 and 5 represent two successive pruning stages of seconds sets of possible initial/final stations.

So, following rules R1 and R2, stations in regions 33 and 34 that are the closest to the departure location 31 and arrival location 32, respectively, are removed as shown in FIG. 4 for the determination of possible initial and final stations for the algorithm.

The set of constraints (geometric constraint) of rule R3 limits the number of stations that are used in the optimization while keeping the ones that are in the general direction of the arrival location 32 from the departure location 31.

Figure 5:
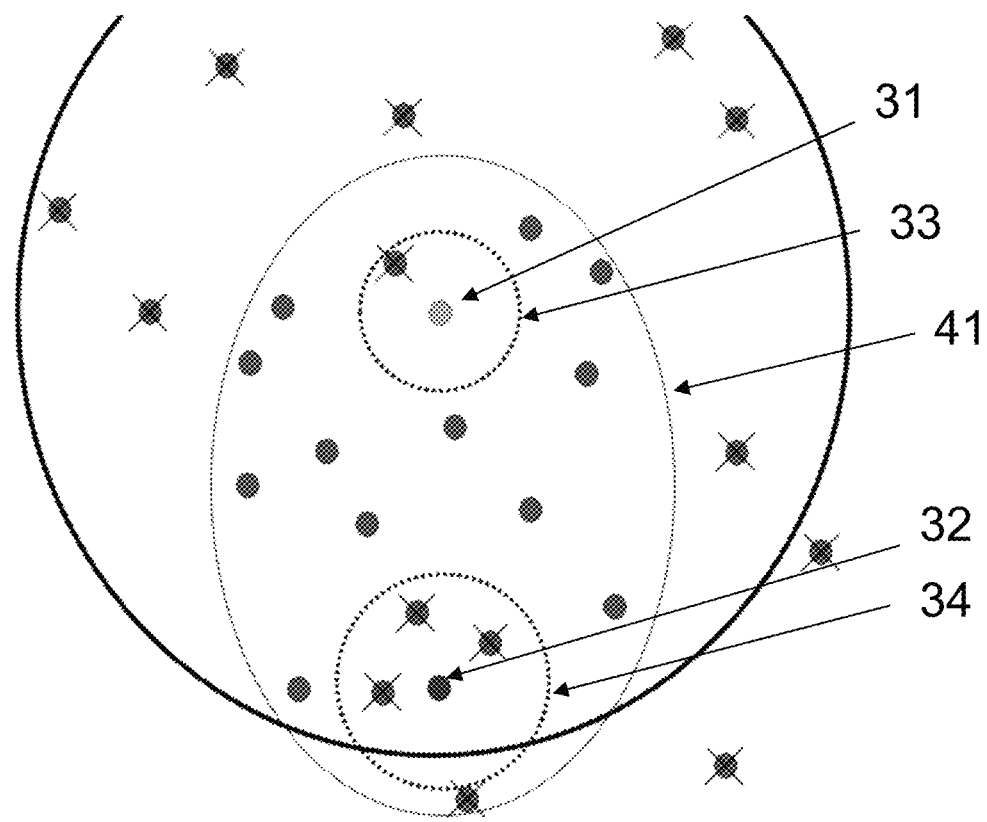

For example, the geometric constraint may be defined as being contained within a geometrical shape 41, as illustrated in FIG. 5.

In other words, this shape is constructed (based on a cost, see below), and stations within this shape are considered as fulfilling the geometrical constraint, while stations outside this shape are considered as not fulfilling the geometrical constraint. The geometric shape is preferably an ellipse, but it could also be a polygon such as a rectangle, a rhombus, a diamond, a triangle, combinations thereof, etc., and may even be disconnected or have holes. The described methodology is directed to a set of constraints, but is not limited to a particular shape, to define the set of constraints, such as the elliptical shape represented by the Figures. The general idea is that the geometric shape defines a "lane" between the departure location 31 and arrival location 32, to avoid considering stations which would lead to undesired itineraries.

Stations not complying with the geometrical constraint; e.g., outside the geometric shape 41 are removed, see FIG. 5.

Figure 2:
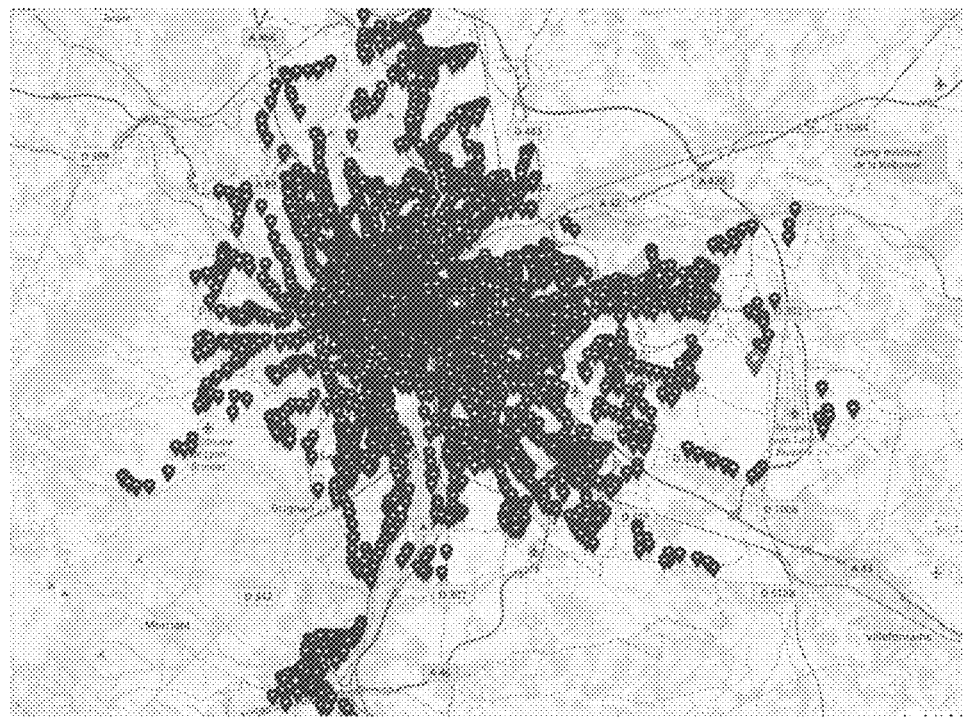
FIG. 2 represents possible stations in a real-world example.
Figure 3:
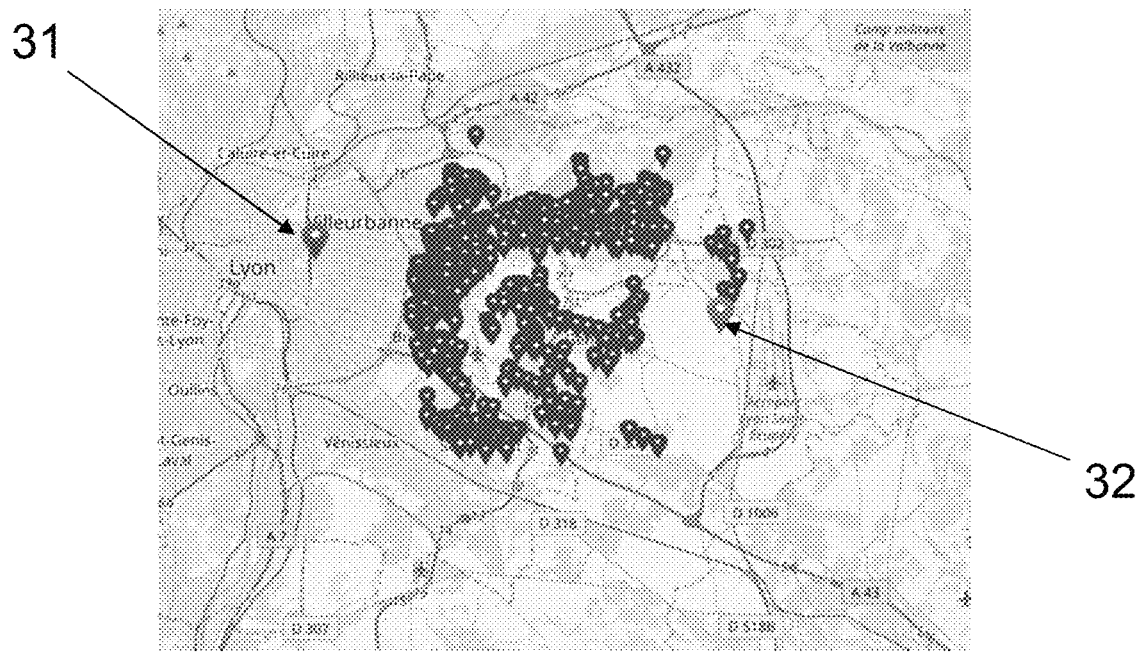
FIG. 3 represents a possible set construction of initial stations.

For example, FIG. 3 depicts the stations from the FIG. 2 respecting the above-mentioned rules when considering the arrival location 32 (i.e., the arrival location constitute the second set of final stations). It can be seen that the number of stations in FIG. 3 has been sensibly reduced from the number in FIG. 2.

In practice, the initialization phase could be defined by a step (a) of determining a first set of possible initial stations, a second set of possible initial stations, a first set of possible final stations and a second set of possible final stations in said multimodal transportation network, such that: (1) the possible initial stations of the first set of possible initial stations are (all) the stations of said multimodal transportation network reachable from the departure location using a first transportation mode at a given first maximum cost; (2) the possible final stations of the first set of possible final stations are (all) the stations of said multimodal transportation network from which the arrival location is reachable using the first transportation mode at the given first maximum cost; (3) the possible initial stations of the second set of possible initial stations are the stations: (a) reachable from the departure location using a second transportation mode at a given second maximum cost, (b) which do not belong to the first set of possible initial stations or to the first set of possible final stations, and (c) which comply with a geometric constraint defined by the departure location and the arrival location; and (4) the possible final stations of the second set of possible final stations are the stations: (a) from which the arrival location is reachable using the second transportation mode at the given second maximum cost, (b) which do not belong to the first set of possible initial stations or to the first set of possible final stations, and (c) which comply with said geometric constraint defined by the departure location and the arrival location.

Preferably, the second sets are initialized to all stations reachable from the departure location/from which the arrival location is reachable, using the second transportation mode at the given second maximum cost, and then these sets are pruned.

Here, the sets are "cost-bound," meaning that the cost for reaching the stations is lower than a bound, the maximum cost, cost being in particular chosen among duration, travelled distance (i.e., "real" distance using the corresponding transportation mode), Euclidian distance (i.e., distance "as the crow flies"), taxi fee, emitted $CO_2$, etc. For the first sets (stations reachable by walking), the first maximum cost could be 10 minutes or 1 km (of travelled distance). For the second sets (stations reachable by taxi), the second maximum cost could be 20 minutes or 25 km (of travelled distance).

All the stations at maximum cost B, can be obtained, for example, by starting a forward/backward Dijkstra search from the departure/arrival location and stopping the search when the bound has been reached. All the stations reached will then be within the bound, and the exact cost for each station will be known.

Another method for computing the maximum cost B is to consider a distance radius around the location, such that no station respecting the bound would be out of the radius. For distance bounds, it is sufficient to consider a radius equals to the bound. For duration bounds, radii can be obtained by setting a maximum mean speed for the car. Then, the set of stations obtained can be pruned by computing the real duration or distance to each station within the radius.

Cost could also be considered when assessing the geometric constraint. More precisely, the geometric constraint could concern the costs for reaching (min-cost paths) a station from the departure location and the arrival location from this station using the second transportation mode; i.e., a station complies with said geometrical constraint if the sum of the costs for reaching this location from the departure location and the arrival location using the second transportation mode is below a value function of the cost for reaching the arrival location from the departure location using the second transportation mode.

For instance, if the arrival time in a taxi road network with time-dependent arcs is considered, the path starting at t, may be computed for each station: (1) first the arrival time a(o, s, t) at the station s from the departure location o starting at t; (2) the arrival time a(s, d, a(o, s, t)) at arrival location d starting from station s at a(s, d, a(o, s, t)); and (3) the arrival time a(o, d, t) at arrival location d starting from departure location o at t.

Then, the geometrical constraint may be defined as $$a(o, s, t)+a(s, d, a(o, s, t)) \le \alpha.a(o, d, t)$$

where $\alpha$ is a real number greater than 1, in other words the function of the cost for reaching the arrival location from the departure location is multiplication by $\alpha$.

Note that if the function is the cost for reaching the arrival location from the departure location plus a predetermined cost and the cost is a distance in the mathematical sense, it matches the intuitive definition of an ellipse, meaning that the geometrical constraint is then equivalent to being contained within an ellipse.

Figure 6:
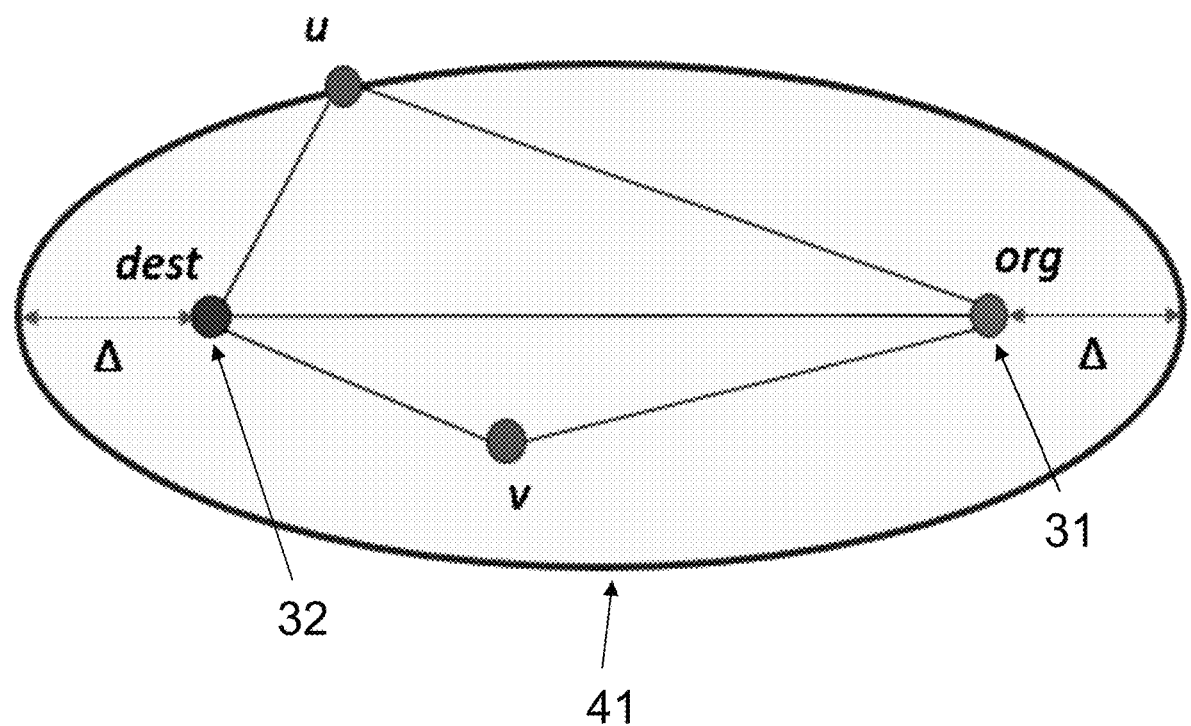
FIG. 6 represents an ellipse used in computing an itinerary from a departure location to an arrival location.

In other words, the ellipse is preferably such that for every location within the ellipse, the sum of the costs for reaching this location from the departure location and the arrival location using the second transportation mode is below the cost for reaching the arrival location 32 from the departure location 31 using the second transportation mode plus a predetermined cost: u belongs to the ellipse if C (departure, u)+C(u, arrival)≤C(departure, arrival)+2Δ, see FIG. 6.

Mathematically, the ellipse is a cost ellipse having as focal points the departure location and the arrival location. If the cost is Euclidean distance, the ellipse could be directly drawn on a map and the pruning be done geometrically. Alternatively, the same pruning could be done with exact duration or travelled distance, using for example a forward Dijkstra search from the departure location and a backward Dijkstra search from the arrival location. The geometric shape would then not be exactly that of an ellipse, since those costs are usually non-symmetric.

In some embodiment, some specific mobility points that are useful in the current network for the second transportation mode (such as taxi stations, or park-and-ride/parking lots), could be added back to the second sets.

It is to be noted that, when determining the second sets of possible initial or final stations (and/or in the following query phase), a waiting time is advantageously considered at the beginning and/or at the end of the taxi ride. Indeed, before starting the ride a few minutes are needed for the taxi to reach the user and to park (it could include time for taxi to come if the query concerns a travel starting now), and after ending the ride the taxi needs also a few minutes to park and to be paid by the user. Said waiting time can be taken into account when computing costs.

In a following step (b), a suitable known routing optimization algorithm such a Trip-Based Public Transit Routing or RAPTOR can be performed based on the first and second sets of possible initial and final stations. In other words, at least one optimal itinerary according to at least one criterion is selected among the itineraries having a main part from an initial station to a final station each belonging to the first or second sets of possible initial or final stations.

It is to be noted that preferably, the taxi shall stay an option so that several requests could be performed so as to select a plurality of optimal itineraries: (1) at least one among the itineraries having a main part from an initial station to a final station each belonging to the first sets of possible initial or final stations; i.e., without taxi; and (2) at least one among the itineraries having a main part either from an initial station belonging to the second set of possible initial stations (to any final station belonging to the first or second sets of possible final stations), or having a main part to a final station belonging to the second set of possible initial stations (from any initial station belonging to the first or second sets of possible initial stations); i.e., with at least one taxi trip.

The itineraries selected are the optimal ones with respect to the criterion, preferably arrival time and/or number of transfers. When minimum arrival time is considered, requesting the optimal itineraries is referred to as "earliest arrival time query."

For example, in the Trip-Based Public Transit Routing algorithm, for each initial station, is scanned each line that passes by it and only the earliest possible trip after start time+duration(departure location→initial station) (i.e. start time+duration(foot path) for initial stations of the first set and start time+duration(taxi path) for initial stations of the second set) are considered.

When several stations pass by the same line, each earliest trip is considered only once, starting with the station of lower index in the station sequence of the trip. For each iteration, one additional trip is taken in each solution to try and get to a final station.

According to a first embodiment, stations from the first sets and from the second sets are equally treated. Therefore, the algorithm is unbiased and the best overall results could be outputted.

In such an embodiment the Trip-Based Public Transit Routing algorithm could be used as such, without any modification. In particular, the following algorithm could be used:

```
Input: Timetable, transfer set T, source stop p_src, target stop p_tgt, departure
time τ
Output: Result set J
 1:  J ← ∅
 2:  ℒ ← ∅
 3:  Q_n ← ∅ n = 0, 1,...
 4:  R(t) ← ∞ for all trips t
 5:  for each stop q such that Δτ_fp (q, p_tgt) is defined do
 6:      Δτ ← 0 if p_tgt = q, else Δτ_fp (q, p_tgt)
 7:      for each (L, i) ∈ L (q) do
 8:          ℒ ← ℒ ∪ {(L, i, Δτ)}
 9:  for each stop q such that Δτ_fp (p_src, q) is defined do
10:      Δτ ← 0 if p_src = q, else Δτ_fp (p_src, q)
11:      for each (L, i) ∈ L(q) do
12:          t ← earliest trip of L such that τ + Δτ ≤ τ_dep (t,i)
13:          ENQUEUE(t, i, 0)
14:  τ_min ← ∞
15:  n ← 0
16:  while Q_n ≠ ∅ do
17:      for each p_t^b → p_t^e ∈ Q_n do
18:          for each (L_t, i, Δτ) ∈ ℒ with b < i and τ_arr(t,i) + Δτ < τ_min
             do
19:              τ_min ← τ_arr(t, i) + Δτ
20:              J ← J ∪ {(τ_min, n)}, removing dominated entries
21:          if τ_arr(t, b + 1) < τ_min then
22:              for each transfer p_t^i → p_u^j ∈ T with b < i ≤ e do
23:                  ENQUEUE(u, j, n + 1)
24:      n ← n + 1
 1: procedure ENQUEUE(trip t, index i, number of transfers n)
 2:     if i < R(t) then
 3:         Q_n ← Q_n ∪ {p_t^i → p_t^R(t)}
 4:         for each trip u with t ≤ u ∧ L_t = L_u do
 5:             R(u) ← min(R(u), i)
```

A taxi lift (and generally any vehicle ride) has a price, and this price is going to be increasing with the duration of the trip or the number of kilometers.

Thus, according to a second embodiment, the inconvenience of taking a taxi is preferably modelled as at least one additional transfer when considering an itinerary in which the initial station or the final station belongs to the second set of possible initial stations or the second set of possible final stations.

Additional transfers can be seen as a penalty; i.e., a supplementary cost; i.e., when the user enters the taxi it is like the user has already done a trip. Adding one transfer is indeed equivalent to counting one more trip.

Preferably, a "variable" inconvenience may be included as a function of the price of the taxi (i.e., the inconvenience in taking a taxi is considered lower if the station is closer). Preferably this price shall be only taken implicitly into account, rather than generating all the Pareto solutions with this additional criterion, which is computationally expensive and usually leads to a high number of solutions.

To this end is preferably considered a modeling wherein the sets of stations are clustered; i.e., separated into subsets, according to their cost for being reached from the departure location. In other words, the second sets are separated into several subsets, in particular as a function of at least one predetermined cost threshold below the second maximum cost, each subset being associated to a (different) number of additional transfers, in particular increasing numbers.

The cost thresholds can be used for defining boundaries of the subsets: n cost thresholds allow to define n+1 subsets. In the example of the second set of possible initial stations, the set is clustered as follows (the skilled person could perform the same clustering for the second set of possible final stations): (1) the first subset contains the initial stations reachable from the departure location at a cost below the first threshold; (2) the second subset contains the initial stations reachable from the departure location at a cost between the first and the second thresholds; (3) . . . ; and (4) the n+1-th subset contains the initial stations reachable from the departure location at a cost between the n-th threshold and the second maximum cost.

Figure 7:
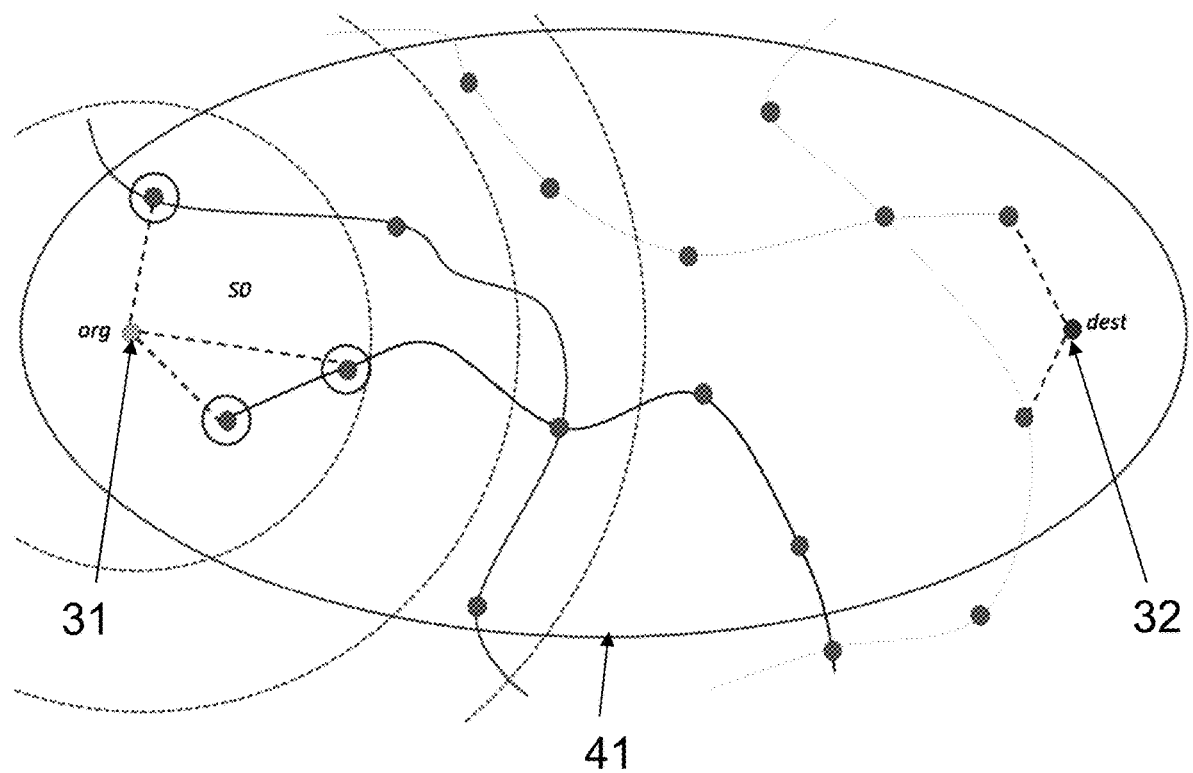
FIGS. 7 to 10 illustrate how the initial/final stations are considered in computing an itinerary from a departure location to an arrival location.
Figure 8:
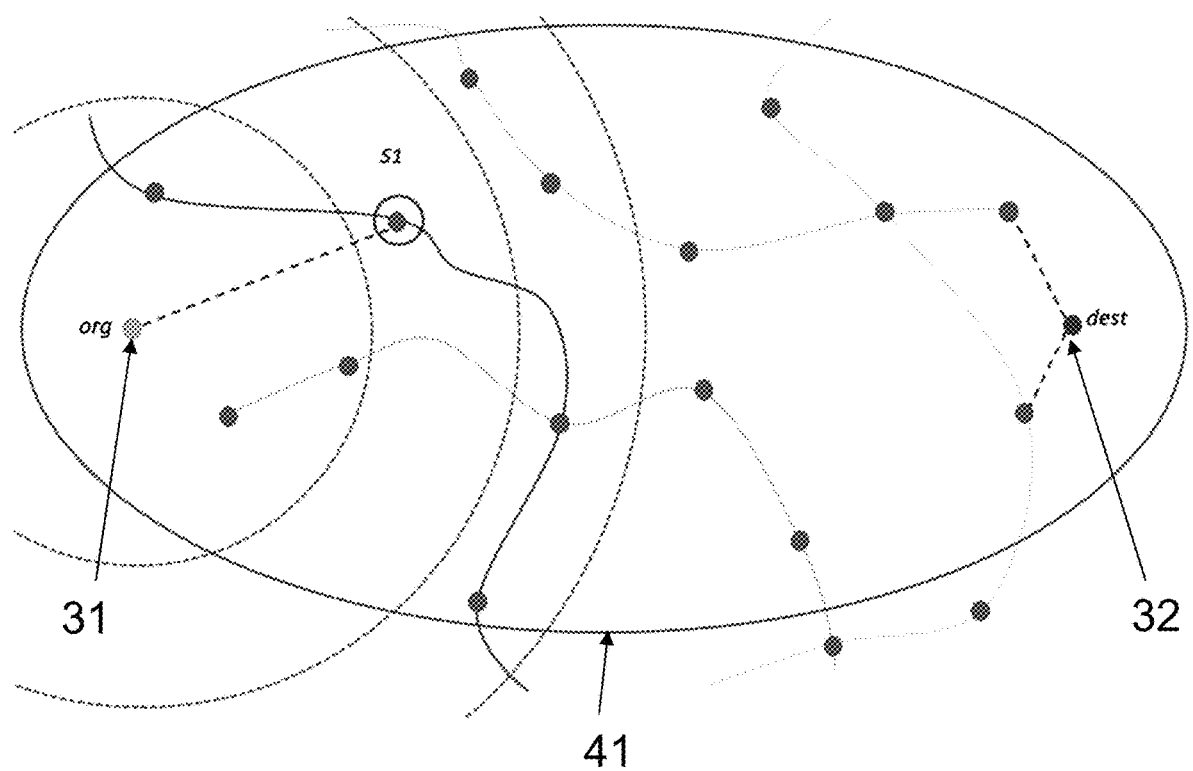
Figure 9:
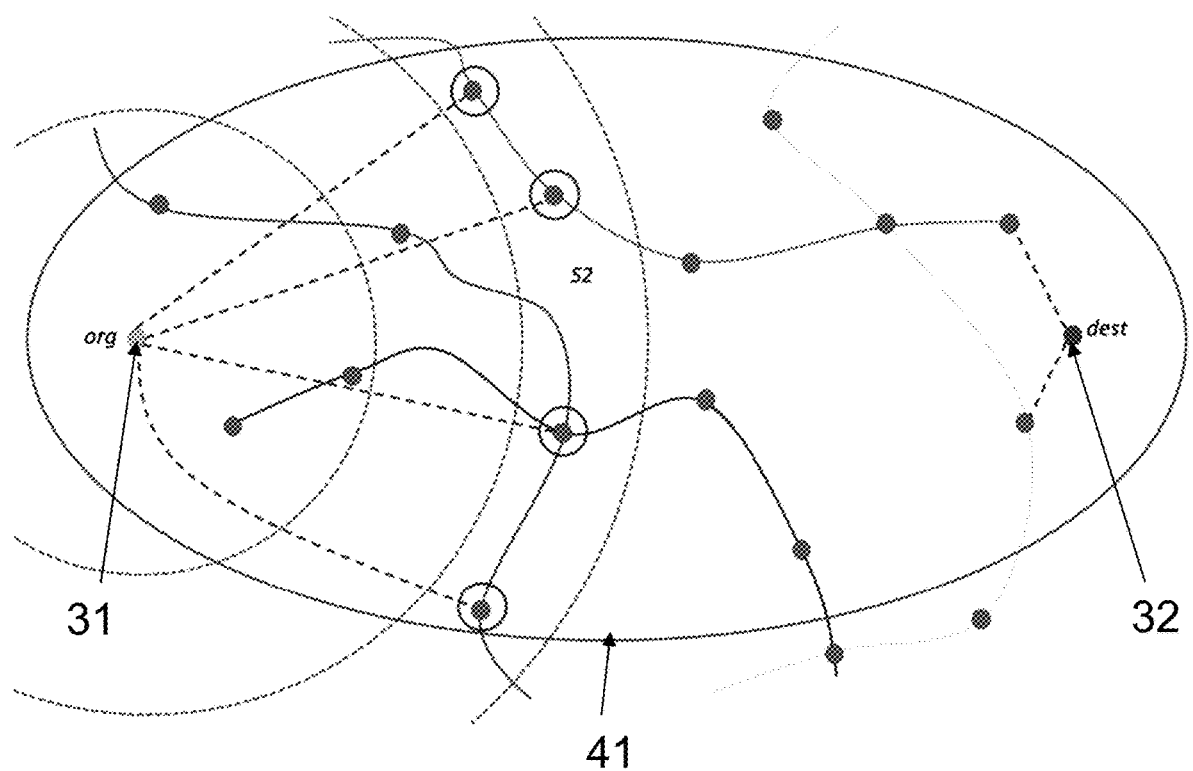

For instance, for initial stations, $S_0$ is the first set, and $S_{i>0}$ are subsets of the second sets, i.e. $\cup S_i$ is the second set. See the examples of FIGS. 7-9 which illustrates a set of possible initial stations with two subsets $S_1$ and $S_2$. In FIGS. 7-9, the cost is solely Euclidian distance, so that circles are simply drawn. Again, travelled distance or duration could be used.

The penalty is advantageously increasing with the index subset, and preferably the n-th subset of the second set of possible initial stations or of the second set of possible final stations is associated to a penalty of n additional transfers. For instance, in the example of initial stations (the same function could be used for final stations), there may be: (1) no additional transfer for initial stations in the first set $S_0$ (stations reachable by walking); i.e., reaching such initial stations is equivalent to taking 0 trips; and (2) n additional transfer for initial stations in the n-th subset $S_{n>0}$ of the second set (stations reachable by taxi); i.e., reaching such initial stations is equivalent to taking n trips.

Note that a number of additional transfers can be reduced by 1 (hence starting at 0) if the first set $S_0$ is not considered; i.e., when the itinerary necessary starts with a taxi trip.

Having an increased number of transfers as penalty is very efficient for algorithms such as Trip-Based Public Transit Routing, wherein for each number of transfers is defined a n-th queue $Q_n$ of trip segments reached after n transfers. In particular, a queue of initial stations (which contains stations with a reaching cost and possibly a number of transfers) can be used to initialize or modify the real line/to the arrival location. For taking into accounts penalties, an additional number of transfers nbt can be added to the triple as a fourth parameter.

The query phase will then be similar but instead of maintaining the earliest arrival time so far ($\tau_{min}$), an earliest arrival time is kept for each number of transfers (family $\{\tau_{min}^n\}_n$), so that the minimum value for the current iteration could be updated from a previous iteration, see the modified algorithm below.

```
input Timetable data, transfer set T
input Source stop p_src, destination stop p_tgt, start time τ
output Pareto front J
J ← ∅, L ← ∅
Q_n ← ∅ for n = 0, 1, ...
R(.) ← ∞ for all trips t
INITIALIZATION ...
τ_min^n ← ∞ for n = 0, 1, ...           ▷ The minimum arrival time at target using n trips at the maxi-
                                           mum
n ← 0
while ∃ m ≥ n, Q_m ≠ ∅ do
    for each p_t^b → p_t^e ∈ Q_n do
                                           ▷ Checking if a target is reached
        for each (Lt, i, Δτ, nbt) ∈ L with b < i and τ_arr(l, i) + Δτ < τ_min^{n+nbt} do
            τ_min^{n+nbt} ← τ_arr(t, i) + Δτ
            J ← J ∪ {(τ_min^{n+nbt}, n + nbt)}, removing dominated entries
        end for
        if τ_arr(t, b + 1) + Δτ_af(L_t) < τ_min then    ▷ Filling the queue for the next round
            for each transfer p_t^i ← p_u^j ∈ T with b < i ≤ e do
                ENQUEUE(u, j, n + 1)
            end for
        end if
    end for
    n ← n + 1
end while
``` queue $Q_n$ of the algorithm, which is in practice a queue of (trips, station or station index), but the skilled person could adapt the algorithm to his needs.

The 0-th queue $Q_0$ is normally initialized with trips that can be directly reached from the departure location (see the lines 9-13 of the above Trip-Based Public Transit Routing algorithm), and all the others queues $Q_1$, $Q_2$, etc. are initially empty.

For each iteration, the algorithm scans the trips in the current queue. Each trip is scanned in turn. If the trip belongs to the target lines (i.e., going to a final station), the trip is compared to the current solution set. Then, the transfers from this trip are added to the queue of the next iteration (see the line 23 of the above algorithm).

In the present case, the Trip-Based Public Transit Routing algorithm could be slightly modified so that the queues $Q_1$, $Q_2$, etc. are initialized with trips starting from initial stations with a penalty of 1, 2, etc. transfers, while the queue $Q_0$ is initialized only with trips starting from an initial station of the first set $S_0$.

The core algorithm then just needs a slight modification on the stopping condition: the algorithm can stop only when all the queues of higher index are empty, and not just the next one.

Figure 10:
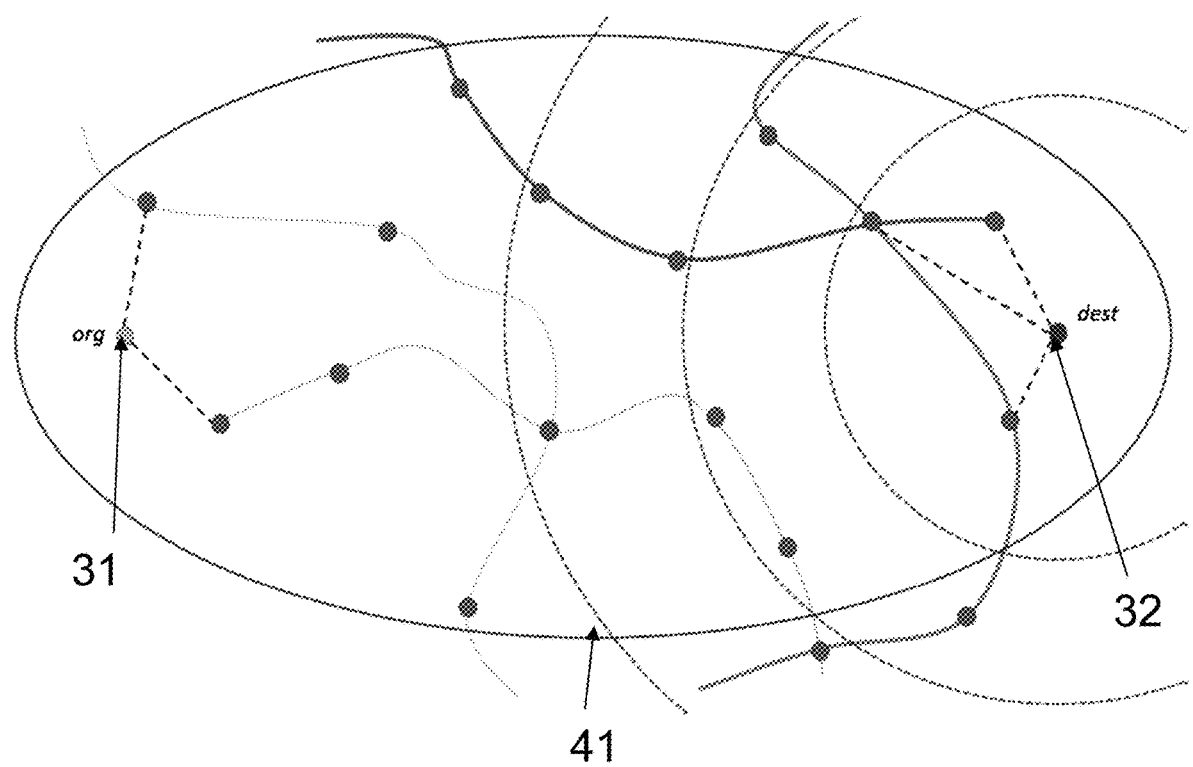

Regarding the final stations, the same procedure could be used for adding penalties at the end of the itinerary if taxi is taken, see the example of FIG. 10.

In the known Trip-Based Public Transit Routing algorithm (see above) the final stations are defined by triples (s, l, Δτ) that indicate the duration Δτ from the station s of the Note that the present process is not limited to a Trip-Based Public Transit Routing based algorithm. Hence, similar modifications can be proposed for others routing optimization algorithm such as RAPTOR: for taxi at the beginning of an itinerary, one needs to create one queue (generally a queue of (line, station or station index)) per iteration number and for taxi at the end, the number of transfers added must be specified in the targets to update the right minimum arrival time. For RAPTOR, the usual implementation has in the queue a station and a minimum arrival time for each number of transfers, and for a set of target stations, with cost to destination and possibly additional number of transfers.

In addition, the present solution for modelling inconvenience of taxi could be used even if the second sets were to be pruned in another manner than previously described (i.e., not necessarily using a geometric shape).

In the such a case, the present process could be directed at a method for computing at least one itinerary from a departure location to an arrival location, each itinerary comprising successively: (1) a beginning part from the departure location to an initial station of a multimodal transportation network of predetermined stations; (2) a main part in the multimodal transportation network, defined as a sequence of displacements each from a station of the multimodal transportation network to another; and (3) an end part from a final station of the multimodal transportation network to the arrival location. The method is characterized in that it comprises the implementation, by a data processor 11, 21 of a device 1, 2, of steps of: (a) determining a first set of possible initial stations (the possible initial stations of the first set of possible initial stations are the stations of said multimodal transportation network reachable from the departure location using the first transportation mode at a given first maximum cost), a second set of possible initial stations (the possible initial stations of the second set of possible initial stations are the stations of said multimodal transportation network reachable from the departure location using the second transportation mode at a given first maximum cost), a first set of possible final stations (the possible final stations of the first set of possible final stations are the stations of said multimodal transportation network from which the arrival location is reachable using the first transportation mode at the given first maximum cost) and a second set of possible final stations (the possible final stations of the second set of possible final stations are the stations of said multimodal transportation network from which the arrival location is reachable using the second transportation mode at the given second maximum cost) in said multimodal transportation network, wherein the second sets are pruned according to a given pruning function; and (b) performing a routing optimization algorithm, according to a set of criteria, so as to compute at least one itinerary having a main part from an initial station to a final station each belonging to the first sets or the second sets of possible initial stations or of possible final stations. The routing optimization algorithm can be either exact (always returns the set of optimal solutions with regards to the set of criteria) or heuristic (returns a set of feasible but not necessarily optimal itineraries). One criterion in the set of criteria is the number of transfers, wherein at least one additional transfer is added to the number of transfer criterion's value when considering an itinerary in which the initial station or the final station respectively belongs to the second set of possible initial station or the second set of possible final stations.

The present method has been tested on 20 generated itineraries in the Lyon metropolis area. Those itineraries start from the suburbs and reach Lyon downtown.

On average, 1.6 solutions are generated per departure/arrival location pair when using 1 subset (only pruning), 1.95 solutions when using 4 subsets, and 2.8 solutions when using 6 subsets for modeling the inconvenience of taking a taxi.

The solutions generated usually start (or end) with stations that belong to different subsets (of a second set), which enables the user to select her solution from a set of diverse alternatives.

Although adding taxi at the beginning or the end of the itinerary increases the complexity of the algorithm, the query time remains manageable for real-time answering (0.7 sec per request on an average personal computer, calling an internal server for the time-dependent routing in road network for the taxi part).

In a third and fourth aspects, the present process concerns a computer program product comprising code instructions to execute a method (particularly on the data processor 11, 21 of the server 1 or the client 2) according to the first aspect of the invention for computing at least one itinerary from a departure location to an arrival location, and storage means readable by computer equipment (memory 12, 22 of the server 1 or the client 2) provided with this computer program product.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer-implemented method for improved routing optimization of a trip-based public transit routing algorithm to compute an itinerary, the method comprising:
    (a) receiving, by a computer, a plurality of stations situated along a multimodal transportation network, each station having an index value based upon a user inputted departure location and a user inputted arrival location;
    (b) improving efficiency of the trip-based public transit routing algorithm, having pruned transfers and no computed minimal neighborhood, by executing, on the computer, an algorithm which increases a number of transfers of a plurality of trips, along the multimodal transportation network, as transfer penalties, by mitigating large Pareto sets and query times present in computed neighborhoods of the trip-based public transit routing algorithm;
    wherein executing the algorithm, on the computer, comprises:
        (b1) scanning each iteration of the plurality of trips in a current queue, to detect a trip that belongs to a final station, compare the trip to a current solution set, and add respective transfers from the trip, to a next queue in a next iteration,
        (b2) modifying the trip-based public transit routing algorithm by initializing the current and next queues with those of the plurality of trips starting from initial stations with incremental transfer penalties and by stopping the trip-based public transit routing algorithm only when both the next queue and all queues of higher station index are empty, and
        (b3) generating a query phase, by updating a minimum value of a current iteration from a previous iteration and by keeping an earliest arrival time for each of the transfers instead of maintaining a minimum value of the earliest arrival time; and
    (c) applying, by the computer, the query phase to generate the itinerary based upon the user inputted departure location and the user inputted arrival location.

2. The method as claimed in claim 1, wherein the generated itinerary includes a succession of:
    a beginning part from the departure location to an initial station of the multimodal transportation network of predetermined stations,
    a main part in the multimodal transportation network, defined as a sequence of displacements from a station of the multimodal transportation network to another, and,
    an end part from the final station of the multimodal transportation network to the arrival location.

3. The method as claimed in claim 1, wherein the stations comply with a geometrical constraint.

4. The method as claimed in claim 3, wherein a station complies with the geometrical constraint if that station is contained within a geometrical shape defined by the departure location and the arrival location.

5. The method as claimed in claim 4, wherein the geometrical shape defined by the departure location and the arrival location is an ellipse.

6. The method as claimed in claim 2, wherein the sequence of displacements from each station of the multimodal transportation network to another, includes an alternative of trips using a transportation mode of the multimodal transportation network, and of those transfers that use a first mode of transportation.

7. The method as claimed in claim 1, wherein the routing optimization is iterative on the number of transfers, wherein one queue of stations is used per iteration, a 0-th queue being initialized with initial stations of a first set ($si_o$) of possible initial stations, and a n-th queue being initialized with initial stations of a n-th subset ($si_n$) of a second set of possible initial stations.

8. The method as claimed in claim 1, further comprising:
(d) electronically filtering, by the computer, multiple optimal itineraries based upon departure time after the multiple optimal itineraries are generated.

9. The method as claimed in claim 1, further comprising:
(d) electronically filtering, by the computer, multiple optimal itineraries based upon the number of transfers within the multimodal transportation network after the multiple optimal itineraries are generated.

10. The method as claimed in claim 1, further comprising:
(d) electronically filtering, by the computer, multiple optimal itineraries based upon estimated monetary cost after the multiple optimal itineraries are generated.

* * * * *